United States Patent
Cleek

[15] 3,704,809
[45] Dec. 5, 1972

[54] PLATELESS PLANTER
[72] Inventor: Alvin L. Cleek, Laporte, Ind.
[73] Assignee: Allis-Chalmers Manufacturing Company, Milwaukee, Wis.
[22] Filed: March 18, 1971
[21] Appl. No.: 125,532

[52] U.S. Cl. ................................................221/220
[51] Int. Cl. .............................................A01c 7/04
[58] Field of Search ..........221/217, 220; 111/77, 78

[56] References Cited
UNITED STATES PATENTS
3,572,547  3/1971  Walberg..............................221/220

*Primary Examiner*—Stanley H. Tollberg
*Attorney*—Kenneth C. McKivett, Charles L. Schwab and Robert B. Benson

[57] ABSTRACT

A plateless planter wherein rotating fingers pick up seeds, move them in adjoining parallel grooves in the periphery of the drum surrounding the fingers to a joint where a single opening is positioned between grooves for receiving the seeds from the rotating fingers.

8 Claims, 14 Drawing Figures

PATENTED DEC 5 1972

Inventor
Alvin L. Cleek
By Kenneth Hutchins
Attorney

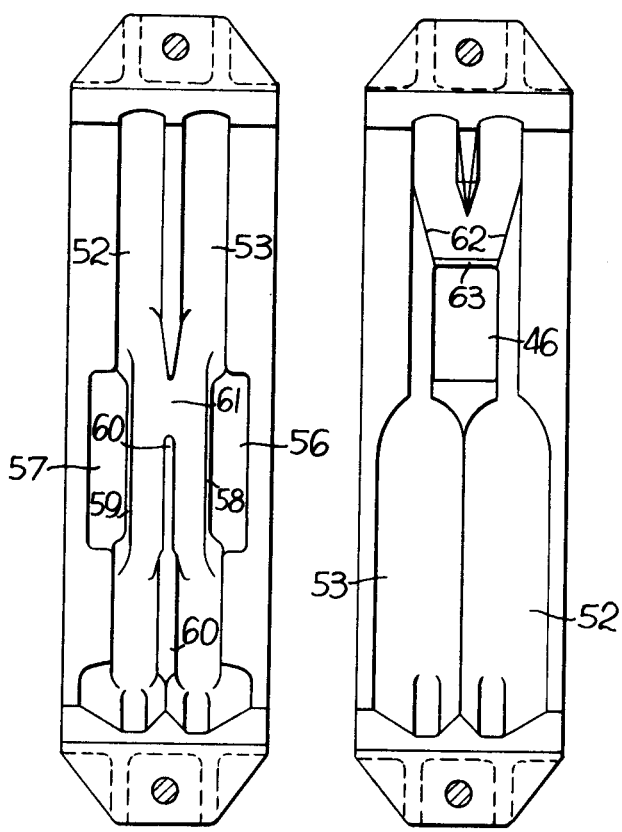
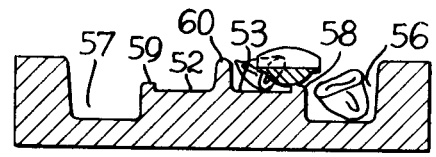
Fig. 9
Fig. 10
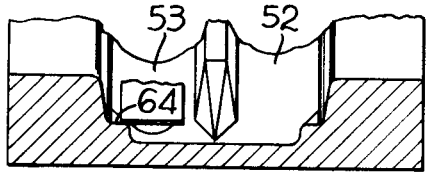
Fig. 11
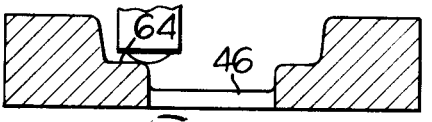
Fig. 12
Fig. 4  Fig. 5
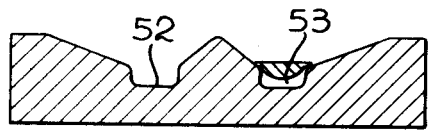
Fig. 6
Fig. 7
Fig. 8
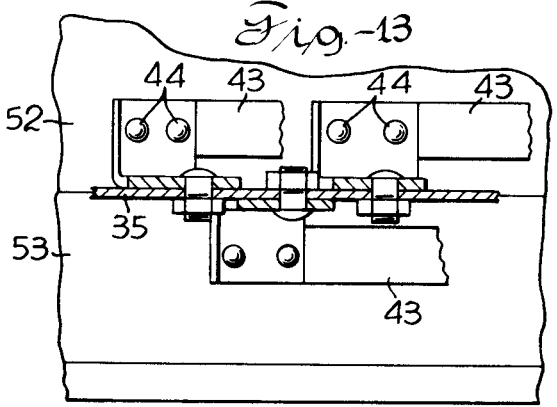
Fig. 14

PLATELESS PLANTER

This invention relates to a new and improved seed planter of the type intended to be attached to the usual tractor and which will deposit seeds spaced apart as desired into a furrow formed in the ground.

This invention is an improvement over the invention shown and described in U. S. Application, Ser. Number 843,544 filed July 22, 1969, now U.S. Pat. No. 3,572,547 reference to which may be had.

An object of this invention is provide a seed planter which will deposit single seeds into the ground at a desired distance apart and wherein the distance between seeds can be controlled at the will of the operator.

Another object of this invention is to provide a seed planter which will eliminate skipping during the depositing of seeds and will also eliminate the depositing of doubles.

Another object of this invention is to provide a plateless planter with pickup fingers operating in grooves in a band surrounding the fingers and wherein the band and the fingers are plastic and metal, respectively, or vice versa for reducing the friction between fingers and band.

Another object of this invention is to provide a plateless planter with pickup fingers made of polyeurethane for reducing the friction between fingers and grooves.

Another object of this invention is to provide a plateless planter with pick up fingers made of polyeurethane and wherein such finger is provided with an enlarged solid portion coacting with the groove for moving seeds along the periphery thereof.

A further object of this invention is to provide a high speed planter which is capable of accomplishing the aforementioned objects at the high rate of speed required by modern farming.

These and other objects of the present invention are set forth in greater detail in the following description having reference to the attached drawings wherein an illustrative embodiment is shown.

FIG. 4 is an enlarged section view of the seed singulator taken on line IV—IV of FIG. 3 with the sidewalls, finger disc, hub and fingers removed for the sake of clarity;

FIG. 5 is an enlarged section view of the seed discharge opening taken on line V-V of FIG. 3 with the sidewalls, finger disc, hub and fingers removed for sake of clarity;

FIG. 6 is an enlarged section view taken on line VI—VI of FIG. 3;

FIG. 7 is an enlarged section view taken on line VII—VII of FIG. 3;

FIG. 8 is an enlarged section view taken on line VIII—VIII of FIG. 3;

FIG. 9 is an enlarged section view taken on line IX—IX of FIG. 3;

FIG. 10 is an enlarged section view taken on line X—X of FIG. 3;

FIG. 11 is an enlarged section view taken on line XI—XI of FIG. 3;

FIG. 12 is an enlarged section view taken on line XII—XII of FIG. 3;

FIG. 13 is an enlarged section view taken on line XIII—XIII of FIG. 3; and

FIG. 14 is an enlarged section view taken on line XIV—XIV of FIG. 3.

Figures 1, 2:
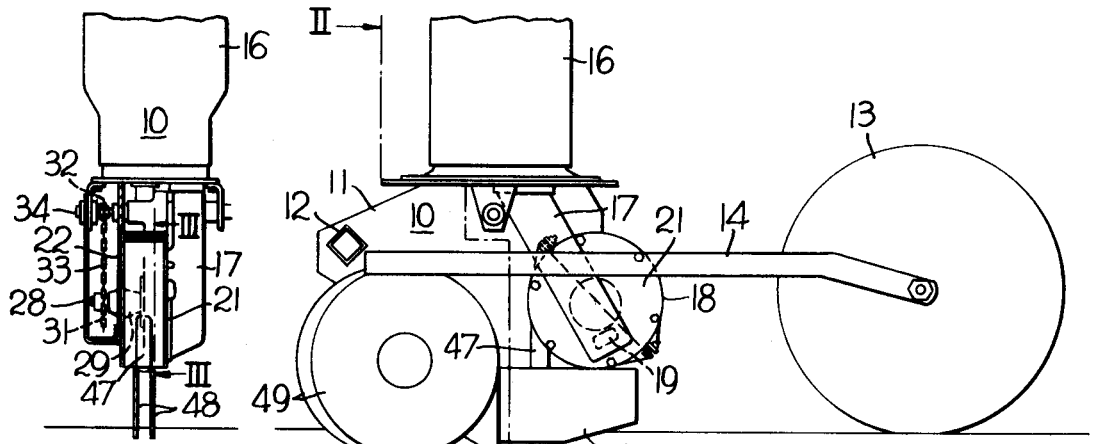
FIG. 1 is a side elevation of a planter embodying the invention.
FIG. 2 is a section view taken on line II—II of FIG. 1.

The reference character 10 designates the planter unit as a whole. Referring to FIG. 1, the planter 10 includes a supporting frame 11 mounted on a tractor carried support bar 12. A press wheel 12 is rotatably carried by a member 14 which is connected at its forward end to frame 11. A conventional hopper 16 is mounted on frame 11 and is provided at its lower end with a depending portion 17 for providing a seed passage from hopper 16 to a circular housing or drum 18 through opening 19 in sidewall 21 of drum 18. An opposite side wall 22 (see FIG. 2) is also provided for drum 18 and is attached to frame 11 by conventional means. A circumferential band 23 (FIG. 3) connects sidewalls 21 and 22 to form drum 18. Band 23 is made up of two parts 24 and 26 which are joined together as by bolting with bolts 27. A shaft (FIG. 2) 28 is journaled in bearing 29 carried by sidewall 22. A sprocket 31 is attached to one end of shaft 28 and is drivenly connected to a sprocket 32 by means of chain 33. Sprocket 32 is attached to shaft 34 which is journaled in frame 11. Shaft 34 is driven by conventional means (not shown) from press wheel 13.

Figure 3:
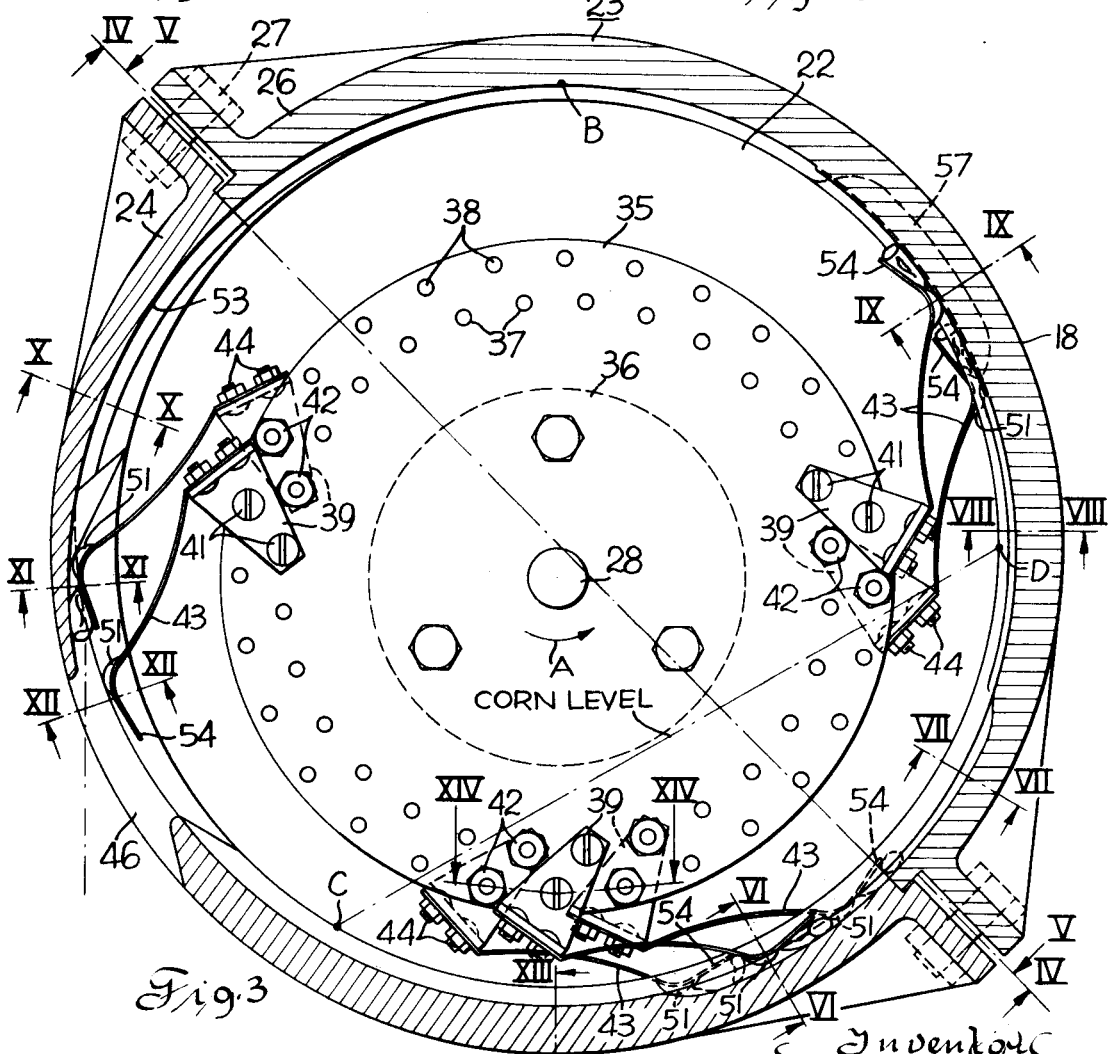
FIG. 3 is an enlarged section view taken on line III—III of FIG. 2.

A disk 35 (see FIG. 3) is bolted to a hub 36 which is attached to shaft 28 and disk 35 is provided with a plurality of openings 37 and 38 through which angle brackets 39 are attached to disk 36 by means of cap screws 41 and nuts 42. At the outer end of each bracket 39 a seed finger 43 is attached by means of cap screws 44 or other suitable means. Band 23 is eccentrically mounted about shaft 28 so that shaft 28 is closer to band 23 at the lower portion of the band as shown in FIG. 3. Drum 18 is provided with an opening 46 through which seeds are discharged. Upon leaving drum 18 the seeds pass through a hollow member 47 (see FIG. 2) from whence they are discharged into a furrow between runners 48. The furrow having been formed by disks 49 which are carried by frame 11 as is also runners 48. Press wheel 13 (FIG. 1) presses soil into contact with the dropped seeds and firms them down.

Flexible polyeurethane fingers 43 are rigidly attached at one end to disk 35 and rotate with it in the direction shown by arrow A in FIG. 3. Fingers 43 are provided with heels 51, which are enlarged portions of greater thickness of fingers 43 which ride in grooves 52 or 53 (FIGS. 4 & 5) located in the inner diameter of circular housing 18. It should be noted that the portions of grooves 52 and 53 from top dead center B (FIG. 3) around to discharge hole 46 are concentric with shaft 28 and not with housing 18. If these grooves 52 and 53 were concentric with the housing, the fingers would gradually be deflected inward as the finger traveled nearer to the discharge hole 46, thus raising the distal end or toe 54 of the finger 43 with respect to its groove. At some point ahead of hole 46, they could be raised high enough so that the finger would lose its grip on the seed completely. The seed would then be released prematurely and either fall into the ground out of its desired position or fall off to the side and return to the seed supply in drum 18 and thereby resulting in a miss in the planting. The distance from the shaft 28 to the grooves at discharge hole 46 should be substantially equal to the shaft to groove distance at top dead center.

It should be noted that adjacent fingers 43 are mounted so that they do not coact with the same groove. This relationship is clearly brought out in FIG. 14 wherein the finger 43 farthest to the left will coact with groove 52 while the adjacent finger will coact with groove 53 and the remaining finger will react with groove 52. This alternate method of mounting fingers along with the utilization of two grooves permits the planter to be operated at any desired seed spacing at any reasonable speed of the towing tractor.

During operation the housing 18 is filled with seed to approximately the level shown in FIG. 3. This level is continuously maintained by conventional means. A finger 43, rotating with disk 35, hub 36 and shaft 28 passes into the mass of seed at point C. Due to the eccentricity of the shaft with respect to the housing 18, the trailing portion (anchored end) of the finger is at its closes position relative to the housing. As the finger 43 moves into this position, the toe of the finger 43 moves away (radially inwardly) from the housing groove 53, using the heel 51 as a fulcrum. Thus, a maximum cross-sectional area (formed by the toe and groove bottom) is presented for engagement of one or more seeds. It is to be noted that the groove walls are beveled as shown in FIG. 13 to aid in movement of seeds into the finger path.

The finger emerges from the seed mass at D, with one or more seeds between the leading portion of the finger and the groove bottom. The eccentricity of the shaft is now allowing the toe of the finger to move nearer to the groove bottom, thus creating a gripping action by the finger on the seed. The fingers continue around to the singulating grooves 56 and 57 which are located approximately at the 2 o'clock position and extend parallel to grooves 53 and 52 respectively. The configuration of these singulating grooves is shown in FIGS. 4 and 9. A pair of splitters 58 and 59 are positioned between the centerline of the finger path and the singulating groove 56 and 57, respectively. The function of the splitters is to disrupt the state of equilibrium that may exist between a finger and two or more seeds trapped under it, and to divert excess seeds into the adjoining singulating groove. Rejected seeds are free to fall from the singulating grooves back into the seed supply.

Occasionally two seeds may be positioned under the finger such that the splitter forces them both toward the center line between grooves. In such an event, the seed nearest the center line will be retained only by the inside edge of the finger and the center land 60 between the grooves 52 and 53. To eliminate this seed the center land 60 is interrupted at 61 (FIG. 4). The splitter is positioned outside of the centerline of the seed finger otherwise it could cause the rejection of seeds from under a finger where only one is present.

After the finger passes the singulating groove, the selected seed is conveyed past top dead center B (FIG. 3) and on around to the discharge hole 46. As the finger approaches the hole 46, the seed is pushed sideways by the inclined (with respect to the finger path) wall 62 (FIG. 5) while the heel of the finger rides on the raised portion of the groove bottom 64. (See FIG. 11) In this manner the seed is released while the finger is carried past the edge of the hole 46. If the hole extended across the full width of the finger path, the finger would fall into the hole (since, with the housing in place, the finger is displaced from its free state) and could not be brought back. The upper edge of the hole is chamfered at 63 (FIG. 5) to permit a gradual release of pressure on the seed. If this pressure is relieved abruptly, the seed is violently snapped outward in a radial direction. This causes the seed to bounce erratically down through drop tube 47 causing a delay in the seed reaching the ground and hence causing irregular spacing in the row as well as possible physical damage to the seed.

After the seed is discharged the finger moves past the hole and back into the seed mass at C and the process is repeated. It is apparent from the number of seed fingers provided that a wide latitude in planting speed is provided without moving the seeds at a speed difficult to handle.

The embodiments of the invention in which an exclusive property or privilege is claimed are defined as follows:

1. A seed planter comprising a circular band having a seed discharge opening on the periphery thereof and having opposed sidewalls attached to said band for closing same, and having a seed receiving opening at a lower portion of one of said sidewalls to form a seed supply, a rotatable shaft journaled in one of said sidewalls, a disk attached to said shaft for rotation therewith substantially midway between said sidewalls, a plurality of fingers attached to the periphery of said disk, said band having a first pair of parallel extending grooves formed in the inner periphery thereof, said fingers being provided with enlarged portions fitting into said grooves for guiding said fingers during rotation thereof, said disk being positioned between said grooves and a seed singulating means including a second pair of grooves extending parallel to said first pair of grooves and wherein said second pair of grooves partially occupy the space of said first grooves so that when said fingers are moving seeds along said first grooves excess seeds will drop off into said second grooves.

2. A seed planter as recited in claim 1 and wherein said fingers are so mounted on said disk that every other finger is positioned in one of said first pair of grooves and the remaining fingers are positioned in the other of said first pair of grooves.

3. A seed planter as recited in claim 2 and wherein said seed discharge opening is a common opening encroaching into each of said first pair of grooves.

4. A seed planter as recited in claim 3 and wherein the leading surface defining said discharge opening is chamfered so that the release of seeds from said fingers to said opening is gradual.

5. A seed planter as recited in claim 3 and wherein said discharge opening is of a width that said feed fingers ride on the sidewalls forming said opening.

6. A seed planter as recited in claim 1 and wherein said fingers are made of plastic material and said grooves are formed in metal so friction between said fingers and said grooves is reduced.

7. A seed planter as recited in claim 1 and wherein said first grooves and said second grooves are separated by guide members for camming said fingers slightly inwardly toward said shaft so that excess seeds can drop into said second grooves and return to said seed supply, said guide members define part of one side of said first groove, and second guide members are positioned to define the other sides of said first grooves, and an opening in said second guide members opposite from said second grooves for permitting excess seeds carried by said fingers and which have not dropped into said second grooves to move off into said opening and return to the seed supply.

8. A seed planter as recited in claim 1 and wherein a lower portion of said first grooves are eccentric to said shaft so that when said fingers pass through said seed supply at the lower portion of said first grooves said fingers will be pivoted on said enlarged portions for presenting a large area to pick up seeds, said first grooves being concentrically mounted about said shaft from top dead center to said discharge opening for preventing a premature dropping of the seeds.

* * * * *